United States Patent [19]
Benjamin

[11] 3,949,391
[45] Apr. 6, 1976

[54] PLASMA PANEL LIGHT PEN TRACKING USING ADAPTIVE TRACKING SCAN

[75] Inventor: O'Connell Julien Benjamin, Brooklyn, N.Y.

[73] Assignee: Bell Telephone Laboratories, Incorporated, Murray Hill, N.J.

[22] Filed: May 21, 1974

[21] Appl. No.: 472,058

[52] U.S. Cl. ...... 340/324 M; 315/169 TV; 340/340
[51] Int. Cl.² .......................................... G06F 3/14
[58] Field of Search .... 340/324 M, 324 A, 324 AD, 340/340; 315/169 TV; 178/18–20

[56] References Cited
UNITED STATES PATENTS

| | | | |
|---|---|---|---|
| 3,576,574 | 4/1971 | Baskin et al. | 340/324 AD |
| 3,651,281 | 4/1972 | Mori | 340/324 A |
| 3,651,509 | 3/1972 | Ngo | 340/324 M |

*Primary Examiner*—Marshall M. Curtis
*Attorney, Agent, or Firm*—W. Ryan

[57] ABSTRACT

A light pen tracking system and method particularly adapted for use with a plasma panel in which a first plurality of display sites on a display device are sequentially excited in such manner as to generate a signal which may be detected by a light pen. Upon detection of a first light signal, a second set of display sites centered at a location identified by the first signal and having smaller area than the first scanned area is then scanned. Because a relatively small area is scanned in the second scanning mode, and because the center of this smaller area has been localized by the previous signal detection, it is possible to more closely track rapid movements of a light pen on a display surface.

10 Claims, 5 Drawing Figures

3,949,391

PLASMA PANEL LIGHT PEN TRACKING USING ADAPTIVE TRACKING SCAN

RELATED APPLICATION

Subject matter related to that presented herein is disclosed in U.S. patent application Ser. No. 472,075 by P. D. Ngo and W. H. Ninke filed of even date herewith and having the same title as the present application.

BACKGROUND OF THE INVENTION

The present invention relates to methods and apparatus for detecting the motion of a light-sensitive device over a display surface. In its more particular aspects, the present invention relates to a dynamic light pen tracking method and apparatus for detecting the motion of a light pen over a display surface.

BACKGROUND AND PRIOR ART

Display devices are now used in a variety of applications, both with a computer or other external control system or on a stand-alone basis. Many prior art display systems require the use of a separate source of memory for storing and applying refresh signals to a cathode ray tube (CRT) or a similar display device. See, for example, U.S. Pat. No. 3,653,001 issued Mar. 28, 1972 to W. H. Ninke and U.S. Pat. No. 3,389,404 issued June 18, 1968 to R. A. Koster.

More recent developments in the display field have included the so-called plasma panel described, for example, in U.S. Pat. No. 3,559,190 issued Jan. 26, 1971 to Bitzer et al. Plasma panels have an advantage over CRT display systems in that the former include a so-called self-memory facility, which eliminates the need for constant information-bearing refresh signals. Rather, individual cells in any array are typically written or turned on by the application of coincident current signals exceeding a first threshold, while others remain in an off condition. Once established in the on condition, cells may be caused to remain on, i.e., they are sustained, by the application of signals exceeding a second (lower) threshold. These latter signals are non-information-bearing sustain signals which are applied to all cells but are effective only with respect to previously on cells. These latter cells, having an inherent memory capability, provide signals which add to the sustain signals to again exceed the first threshold.

One aspect of CRT display systems of the type described generally above which has found great favor with users is a so-called light pen capability. By means of this feature a user can point a light-sensitive pen at a particular display item, e.g., a point, character, etc., while such display item is being formed by the electron beam of the CRT, thereby identifying to a control system the particular display item or a datum relating thereto. Such light pen techniques are described, for example, in U.S. Pat. No. 3,337,860 issued Aug. 27, 1967 to A. C. O'Hara, Jr. The system described in the O'Hara patent relies on the detection of a light pulse during each refresh period of a CRT. Thus while the refresh requirement in CRT-based systems is disadvantageous from a memory point of view, nevertheless it greatly simplifies the implementation of a light pen capability.

Plasma panels, on the other hand, have, until recently, had severe limitations regarding the use therewith of a light pen pointing device. For example, R. L. Johnson, in his Ph.D. thesis submitted to the University of Illinois and issued in *University of Illinois Coordinated Science Laboratory Report R-461* entitled "The Application of the Plasma Display Technique to Computer Memory Systems," April 1970, describes efforts in this field. In U.S. patent application, Ser. No. 345,893 filed Mar. 29, 1973 by P. D. Ngo, now U.S. Pat. No. 3,851,327 issued Nov. 26, 1974, there are disclosed important additional techniques for the identification of the position of a light pen adjacent a plasma panel.

While the detection of a single point or display entity on a display device is of considerable consequence, nevertheless many applications, e.g., the writing of handwritten curves and characters, require not only detection of a single point, but also the sequential detection of a number of individual points. Such techniques for detecting a sequence of points using a light pen (light pen strikes) are known as light pen tracking techniques. In a CRT context, such light pen tracking techniques are described, for example, in U.S. Pat. Nos. 3,551,896 and 3,576,574 issued Dec. 29, 1970 and Apr. 27, 1971, respectively, to H. B. Baskin et al. The techniques described in the CRT-based systems of Baskin et al involve the continual up-dating of the position of a special character, commonly referred to as a cursor, as a result of successive detections of this character. The need for this special cursor character arises, of course, to permit its separate identification from the regularly displayed information. It should be clear, however, that the generation of a cursor (or tracking cross, as it is sometimes known) necessarily involves additional complexity and attendant expense.

Another system for evaluating light pen strkes in a CRT-based display system is described in U.S. Pat. No. 3,651,508 issued Mar. 21, 1972 to P. E. Scarborough, Jr. et al. The Scarborough, Jr. et al system involves the identification of a point on a CRT by generating and detecting the presence of a sequence of decreasing images such as vectors.

In the above-cited patent applicaton, Ser. No. 354,893 by P. D. Ngo, there is disclosed a system for generating a scanning pulse suitable for detection by a light pen, which pulse occurs at each "on" display site in a plasma display panel. Further, the light pulse generated by the scanning pulse in the Ngo application is uniquely identifiable by virtue of its special timing in the sustain cycle of the plasma panel.

SUMMARY OF THE INVENTION

The present invention, in typical embodiment, provides a light pen tracking facility based on the light pen identification techniques described in the last-mentioned Ngo patent application, Ser. No. 354,893. In this typical embodiment, the entire area (or some portion less than the entire area) of a display surface is initially scanned and a light pen strike is identified by a light pen held adjacent the plasma panel. Based on the location of this light pen strike, a subsequent scanning is accomplished over a smaller area of the display surface, which smaller area is centered at the location of the previous light pen strike. For example, in an 80×256 rectangular display panel, an initial scan of all X-Y locations is initially accomplished. Then, based on the results of a light pen strike, a second scanning is accomplished over a smaller (typically 16×20-location) area centered at the location of the previous light pen strike.

Based on normal writing techniques by a plasma panel user it is found that in most cases a subsequent light pen strike will occur within the smaller scanned area. Because it takes a considerably shorter time to effect the scan over the 16×20 location area than for the entire panel, it is possible to follow quite rapid motion of a light pen over the plasma panel surface.

When the light pen fails to detect a light pen strike as a result of scanning over the smaller area (tracker mode scanning), or for any other reason, a return to the larger area scanning (finder mode scanning) is accomplished by simply deactivating the light pen. This is accomplished in a preferred embodiment by using a light pen with a pressure-sensitive switch adjacent the sensing tip. Thus, in a natural manner closely approximating writing on paper with a pen, the user-induced light pen motions are quickly localized and tracked, even when large off-display-surface light pen movements are involved.

Other alternative constructions for organizing the initial and subsequent scans are described in the sequel.

DETAILED DESCRIPTION

To simplify the present disclosure it proves convenient to make extensive reference to the earlier-filed patent application by P. D. Ngo, Ser. No. 345,893 filed Mar. 29, 1973, hereinafter the Ngo application, which application is hereby incorporated by reference and should be considered as if set forth in its entirety herein. The Ngo application describes a system for generating a uniquely identifiable light pulse at any location in an otherwise standard plasma panel. By providing means to sequentially increment the coordinate position specifying a plasma cell chosen to emit such a unique light pulse, it is possible to uniquely identify any single location in the plasma panel array of cells. When the viewing aperture of the light pen includes several cells, close approximation to a center of aperture location is achieved. Thus by scanning over the entire panel starting from a convenient reference point, say the upper lefthand corner of a rectangular panel, and proceeding line by line to the lower righthand corner of the panel, it is possible to identify a small area on the panel. A light pen of standard design may advantageously be used with the system described in the above-cited Ngo application.

Figure 1A:
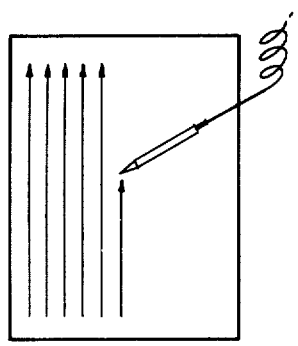
FIG. 1A shows scanning in a first mode over an entire plasma panel until a light pen strike occurs.

FIG. 1A shows the scanning regime associated with a first mode of operation in accordance with the present invention. This mode corresponds to that described in the incorporated Ngo application. When a light pen strike occurs the scanning conveniently terminates and the control system is signalled. For convenience in describing the present invention, this mode of operation, scanning line by line starting at the upper lefthand corner (or other reference point) of a panel, shall be referred to as the finder mode. Other starting points might provide convenient in particular cases, but in all cases scanning continues over the entire panel until a light pen strike occurs. The finder mode terminates upon the occurrence of a light pen strike.

Figure 1B:
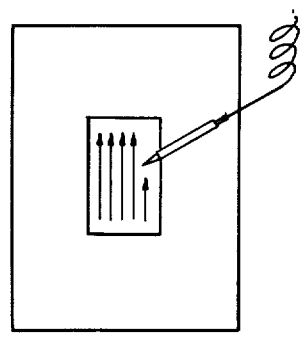
FIG. 1B shows scanning in a second mode over an area smaller than the entire plasma panel based on a previous light pen strike.

A second mode of operation associated with the present invention is shown in FIG. 1B. This mode, conveniently referred to as the tracker mode, involves scanning line by line over a subset of the locations of the entire panel. Since FIG. 1A shows a light pen positioned over a roughly central position on the plasma panel, a light pen strike detected in the finder mode causes the subsequent tracker mode shown in FIG. 1B to involve scanning over an area centered on the position of the previous light pen strike, i.e., roughly centered on the entire panel surface.

The present invention will be described in further detail in connection with FIGS. 2 and 3, which illustrate a block diagram of a typical system in accordance with one aspect of the present invention, and a sequence chart for the operation of such a system, respectively.

Figure 2:
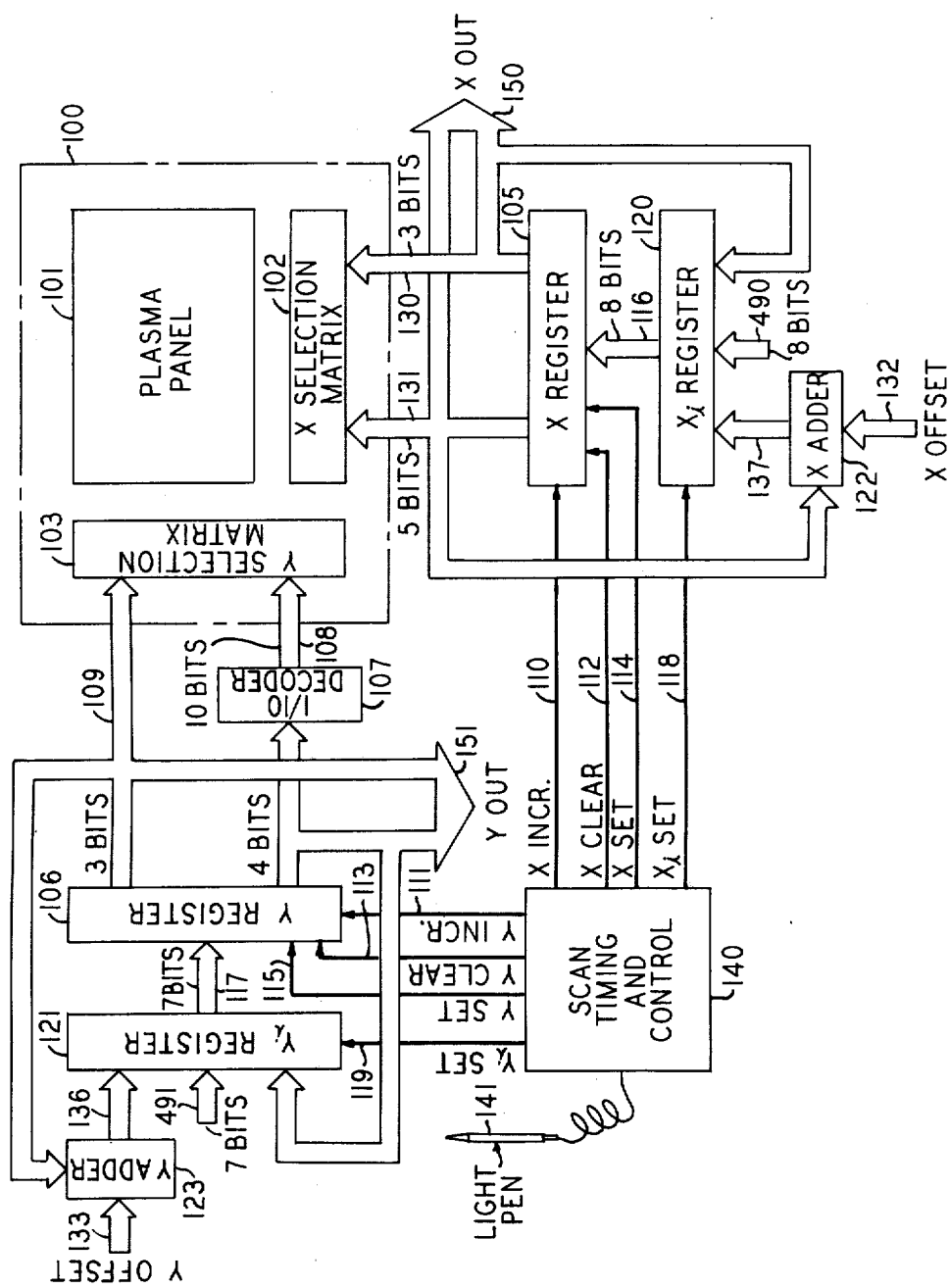
FIG. 2 shows an apparatus arrangement which is useful in accomplishing light pen tracking in accordance with one embodiment of the present invention.

FIG. 2 shows a plasma panel system 100 including a plasma panel 101 and associated X and Y selection matrices, 102 and 103, respectively. A typical plasma panel system which is useful in connection with the present invention is a DIGIVUE Model 80–33 plasma panel manufactured by Owens-Illinois, Inc. DIGIVUE is a registered trademark of Owens-Illinois, Inc.

A Model 80-33 plasma panel system includes 256 columns, each identified by a separate X coordinate, and 80 horizontal rows, each identified by a separate Y coordinate. It proves convenient to address each X-line (column) by an 8-bit binary address and each Y-line (row) by a 7-bit binary-coded-decimal (BCD) address. The 80 Y lines are conveniently subdivided into 8 10-line sectors. A particular Y line (row) is therefore addressable by 3 sector bits and 10 line-designating bits. Thus, while the X selection matrix 102 shown in FIG. 2 is seen to be responsive to signals from X register 105 which includes a total of 8 bits, Y selection matrix 103 is responsive, ultimately, to the 7-bit Y register 106. The output of the Y register is, however, conveniently divided into a 4-bit byte and a 3-bit byte. The 3-bit byte is used to directly select one out of the eight Y sectors. The 4-bit byte from register 106 passes by way of a 1-out-of-10 decoder 107 to generate an output signal on 1 out of the 10 lines, 108, which lines are then used to select the row within a sector designated by the 3-bit line 109 applied to Y selection matrix 103.

That portion of the system shown in FIG. 2 which includes the plasma panel system 100, X and Y selection registers 105 and 106 and 1 out of 10 decoder 107 embodies only standard prior art techniques and construction. The X and Y registers 105 and 106 are advantageously arranged to be standard counter circuits capable of registering a count of $2^8 = 256$ and $2^3 \times 10 = 80$, respectively. Register 105 is a standard binary counter while 106 register BCD counts. These latter registers are, in accordance with standard prior art techniques, arranged to be subject to incrementing on respective incrementing leads 110 and 111. Likewise, the X and Y registers are subject to clearing by signals on respective clear leads 112 and 113. The X and Y registers 105 and 106 are also, in accordance with standard techniques, arranged to be subject to presetting to a predetermined count by way of set leads 114 and 115 which effect a transfer of bits by way of signal paths 116 and 117.

Input bits available on paths 116 and 117, in turn, are supplied by the $X_i$ and $Y_i$ registers 120 and 121, respectively. The contents of register 120 are derived in part by the low order 3 bits applied to the X selection matrix 102 on leads 130. The remainder of the contents of the $X_i$ register are derived by adding in X adder 122 the number representing the 5 high order bits applied to X selection matrix on leads 131 to a number representing a desired X offset. This latter number is represented by signals applied on leads 132. The bit pattern representing the sum is applied to the $X_i$ register on leads 137.

Similarly, the contents of register 121 are derived in part by adding in Y adder 123 the 3 high order Y address bits appearing on leads 109 to a Y offset value represented by signals applied on leads 133. The output of Y adder 123 on leads 136 is used to determine the 3 high order bits of the $Y_i$ register 121.

Scan timing and control circuit 140, in combination with $X_i$ and $Y_i$ registers 120 and 121, and with X and Y adders 122 and 123, provides the necessary signals to sequence and control the operation of the system of FIG. 2. Details of operation of timing and control circuit 140 will be deferred until the overall operation of the system of FIG. 2 is described.

FIG. 2 also shows a light pen 141 which is of standard design. Advantageously, light pen 141 is of the type which is activated upon pressure of its light-sensing tip against the face of the display surface, e.g., against the glass covering of the DIGIVUE plasma panel. Such preferred light pens are described, for example, in U.S. Pat. Nos. 3,569,617 issued Mar. 9, 1971 to M. W. Allen et al; and 3,749,932 issued July 31, 1973 to N. F. Jones. Other examples of light pens useful in connection with the circuit of FIG. 2 include those manufactured by Information Control Corporation, El Segundo, California and identified as models LP-301 and LP-302. The operation of the light pen 141 in FIG. 2 and its interaction with control circuitry is essentially that described in the last two cited patents, the incorporated Ngo application, and U.S. Pat. No. 3,576,574 issued Apr. 27, 1971 to H. B. Baskin et al; the U.S. Pat. Nos. 3,569,617; 3,576,574; and 3,749,932 are hereby incorporated by reference and should be considered as if set forth in their entirety herein.

The details of the circuitry for applying the write and erase signals to the plasma panel system 100 have not been shown in the interest of simplicity and because they form no novel part of the present invention. It is assumed, however, that some information is displayed on panel 101, i.e., some cells are in the on condition. Likewise the special circuitry for providing the scanning erase pulse featured in the Ngo application has been included only to the extent necessary to illustrate the present invention. Thus it is assumed that whenever a scan enable signal is provided, as hereinafter described, there will be applied to the cell identified by the X and Y registers the special erase pulse described in the Ngo application. If the cell so identified is in the on condition, it will generate a light pulse suitable for detection by the light pen 141. The occurrence of the light pulse at the special time in the sustain cycle permits it to be distinguished from the normal light pulse generated by the application of sustain signals to an on cell.

Figure 3:
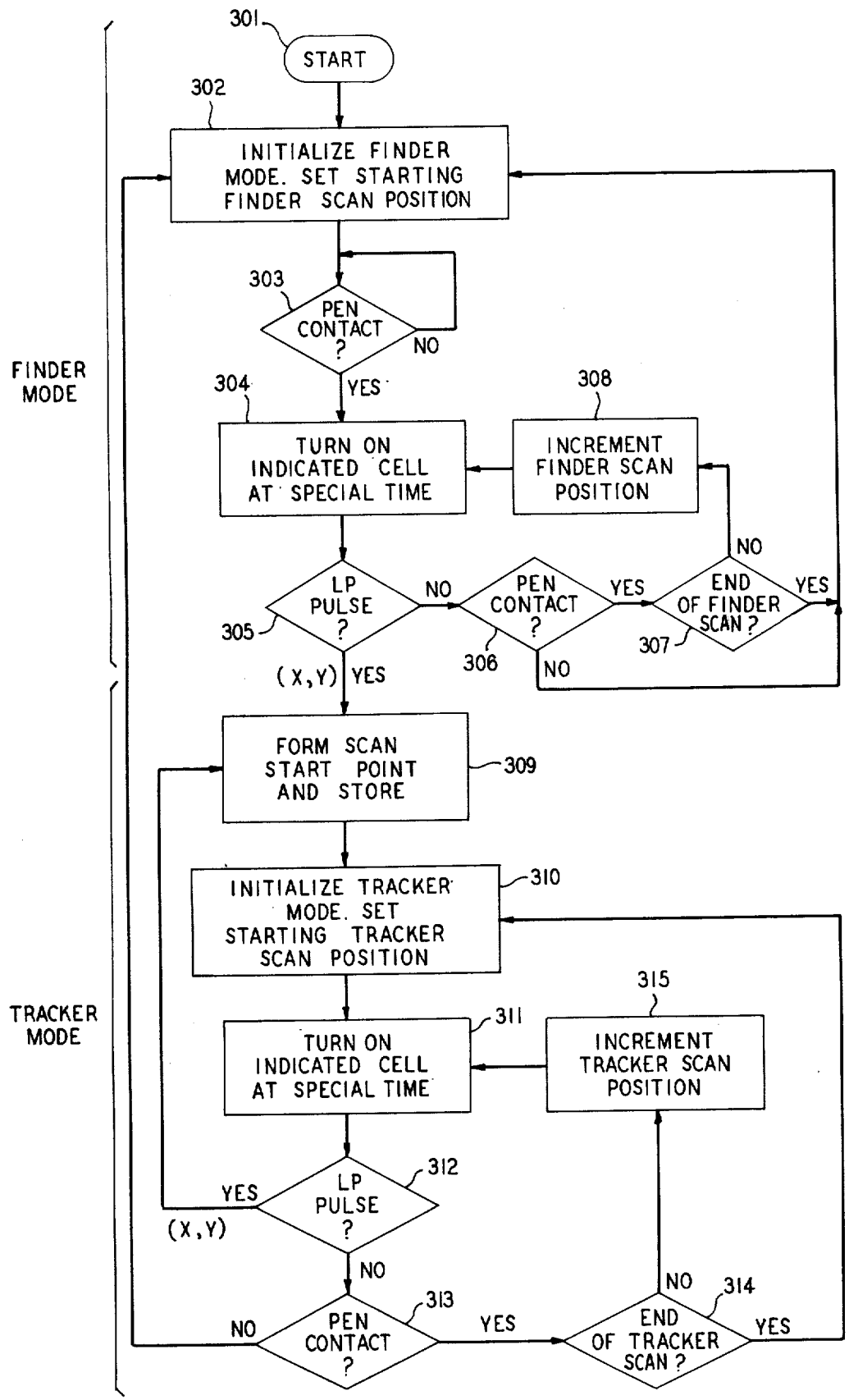
FIG. 3 is a flow chart illustrating a typical operating sequence for light pen tracking using the system of FIG. 2.

Turning now to FIG. 3, it is seen that, after starting at step 301, an initialization is accomplished at step 302. It is assumed that processing starts in the finder mode. Thus step 302 requires that a starting position for scanning over the entire panel (until a light pen strike occurs) be established. Ordinarily, scanning in the finder mode will be begun at a standard reference point, e.g., the upper lefthand corner, at (X, Y) coordinate (O, O). In terms of the circuitry of FIG. 2, the initialization indicated by step 302 in FIG. 3 requires the clearing of both the X and Y registers, 105 and 106, respectively, to the all-zero state. This all-zero state is readily accomplished by clear signals from control circuit 140 on leads 112 and 113.

The test indicated in step 303 in FIG. 3 is one for determining whether the light pen is in contact with the display surface thereby enabling the light pen. In other cases, the test at 303 may be with respect to whether a light pen activation switch other than a contact switch is operated. If the light pen is enabled, the cell located at the (O, O) location on the display panel is caused to emit (as indicated by step 304) the unique light pulse described in the Ngo application. The test at step 305 is one for determining whether the light pen is positioned over the current scanned cell. Thus if, upon initialization, a pulse is detected by the light pen, then the test at step 305 will yield a position result only if the light pen is positioned adjacent an on cell at the display site at coordinate position (O, O). If no light pulse is detected at step 305 and light pen activation is determined to be still present (as tested for at step 306), then a determination is made as to whether the finder scan has proceeded over all display sites, i.e., whether the present scanned position is that corresponding to the lower righthand corner display site. The latter test is accomplished at step 307. If it is determined that the finder scan is not yet complete, then the present position is incremented at step 308 and the scanning pulse applied at the display site indicated by the up-dated coordinate position. The incrementing signals are supplied by control circuit 140 on one or both of leads 110 and 111.

Ultimately, the light pen will detect a light pulse resulting from the applied scanning pulse; the test at step 305 will be answered in the affirmative. It is at this point that the finder mode is terminated and the tracker mode begun. Concurrently, the then-present contents of the X and Y registers 105 and 106 are made available on the sets of output leads 150 and 151 to an appropriate utilization device, e.g., a computer.

The first step in the tracker mode is, of course, to enter the coordinates of the light pen strike determined by the finder mode. This is accomplished at step 309 in FIG. 3. At step 310 in FIG. 3 the beginning point for scanning in the tracker mode is set. In the notation of FIG. 2, this requires that the X and Y offset inputs 132 and 133 have applied to them appropriate offset bit patterns.

The typical 80 × 256 cell panel used by way of illustration in FIG. 2 advantageously uses a tracking mode scanning window of size 16 × 20 cells, i.e., having 16 possible X coordinates and 20 possible Y coordinates. Thus given the location (X,Y) of a light pen strike in the finder mode, and specifying that a tracking mode scanning window shall be centered at (X,Y), implies a tracker mode scan beginning at (X - 8, Y - 10). It has been assumed that the X coordinate increases to the right and the Y coordinate increases from top to bottom in FIG. 2.

The required X offset is then equal to −8. When this value is applied to the adder 122 in FIG. 2 along with the last X coordinate of a light pen strike, the result is, of course, the X coordinate of the beginning point of the following tracker mode scan. Since adding $-8_{10} = -1000_2$ does not involve the lowest order three binary digits of the X coordinte of the location of the previous light pen strike, only the highest order 5 bits of the content of X register 105 are applied to X adder 132. The actual X offset bit pattern is then −00001. The three lowest order bits of X register 105 along with the sum from adder 122 are set into $X_i$ register 120 by $X_i$ SET lead 118. The composite 8-bit word in $X_i$ register 120 is then transferred to X register 105 via leads 116 and $X_{SET}$ lead 114.

The required Y offset is similarly achieved by adding −1 to the bit pattern representing the three highest order bits of Y register. Since these 3 bits define the 10-line sector where the light pen strike occurred, and since the tracker mode scan centered on the previous light pen strike location is to be 2 sectors high, an upward displacement of exactly one sector is required. Again the low order bits, 4 in number for the 1-out-of-10 selection within a sector, remain identical to those for previous light pen strike. The usual Y offset bit pattern is then −001.

If, for example, the light pen strike occurring during the finder mode yields a coordinate position $(X,Y) = (113, 37)_{10} = (01110001_2, 0110111_{BCD})$, then the inputs to the X adder 122 will be 01110 and −00001, the output of adder on leads 137 will be

```
  01110
 -00001
 ──────
  01101
``` and the 8-bit result entered into $X_i$ register 120 and X register 105 will be $01101001_2 = 105_{10}$. Similarly, the inputs to the Y adder will be 011 and −001, the result or leads 136 will be 010 and the 7-bit result entered in the $Y_i$ register 121 and Y register 106 will be $0100111_{BCD} = 27_{10}$.

At step 311 in FIG. 3 scanning is commenced at the initial point of the tracker scan. If the light pen has not been moved since the initial light pen strike in the finder mode, there will, of course, be no light pen pulse when the tracker mode beings. This is the case because the tracker mode "window" is centered about the previous light pen strike location. Thus, without a movement of the light pen the tests at steps 312, 313 and 314 in FIG. 3 will be answered in the negative. Accordingly, incrementing of the tracker scan position at step 315 will be effected. Again assuming that the light pen has not moved since the light pen strike in the finder mode, steps 312, 313 and 314 will be determined in the negative; incrementing at step 315 will continue until the center of the newly defined "window" is reached.

At this time a light pen pulse will be detected at step 312. The light pen coordinates, the contents of X and Y registers 105 and 106, are then delivered to a utilization device on $X_{out}$ leads 150 and $Y_{out}$ leads 151 in FIG. 2. The contents of X and Y registers 105 and 106 will also be used to calculate the beginning point for the next tracker mode scan. With no motion of the light pen assumed, the beginning point for the next tracker mode scan will be the same as for the first one.

If the light pen had been moved during the interval between the light pen strike in the finder mode and the next light pen strike in the tracker mode, the coordinates stored in X and Y registers 105 and 106 will of course, be different at the times of the two strikes. The beginning point for the next tracker mode scan will therefore be different.

Although decision step 313 provides for return to the finder mode whenever no pen contact is detected, it is clear that other mode switching criteria may be used. For example, if upon initialization of the tracker mode at step 310 a timing device is also reset, and if no light pen pulse were detected at step 312 for a predetermined period measured from this initialization, then return may be had to the finder mode upon such a "time-out" criteria. Thus, for example, if 4 complete tracker scans are accomplished (test 314 answered in the affirmative 4 consecutive times) without a light pen pulse being detected at test 312, then a return to step 302 is effected.

It is profitable to consider the potential for light pen tracking using, first, only the finder mode, i.e., using repetitive full display surface scans until a light pen strike occurs and, second, the dual mode operation described above. The single (finder) mode tracking times will be discussed first.

Most present plasma displays have a sustain cycle of approximately 20 μsec. Thus if one cell is addressed per sustain cycle, and an 80 × 256 panel is assumed, a total time of 0.41 seconds is required to address all cells. If it is further assumed that the individual cells are spaced apart by 30 mils, then it is clear that a maximum tracking speed of approximately 0.07 inches/second is possible in the worst case using the finder mode only. If scanning in the finder mode is terminated upon each occurrence of a light pen strike, then, on the average a rate of approximately twice the worst case rate is possible. It should be noted, of course, that average possible tracking rate may not be of importance; an important light pen strike could be missed and the overall function rendered meaningless if the average allowed rate were exceeded.

It is also worth considering the use of multiple cell firings during each sustain cycle while using only the finder mode. Thus, in the case of the 80-row DIGIVUE panel mentioned above, one might consider firing an entire row or sector at one time, with each row or sector fired in sequence until a light pen strike is detected. While this will unquestionably speed up the appearance of a light pen strike, it also necessarily increases the ambiguity of the coordinate position as compared to a cell-by-cell scan. Thus, unless some further, finer scale scanning follows the row, sector (or any other large area) scanning, the location information derived will be of limited value in many cases.

Other schemes based on alternate (odd or even) row or column firing may also be used to speed up the occurrence of a light pen strike in the finder mode. The factor of 2 or 4 achieved by such means is, however, still insufficient to permit tracking of normal hand motion over a display panel. If a further decimation of fired cells is used, e.g., every eighth cell, there is an increased danger that the light pen field of view will not include any fired cells. Thus the decimation techniques taken alone have limited value in increasing tracking speed.

With typical dual-mode tracking, much faster light pen speeds can be tracked in a plasma display system. Thus again assuming the 80 × 256 panel, and a tracking mode "window" or "patch" having 8 × 8 cells on a 60 cell/inch panel, a worst case tracking speed of approximately 30 inches/second is typical. If smaller patches are used, even higher tracking speeds are possible. Larger patches reduce the speed somewhat, but for the relatively large 16 × 20 patch of the type described above, a tracking speed of approximately 5 inches/second is achieved on a 60 cell/inch panel.

Figure 4:
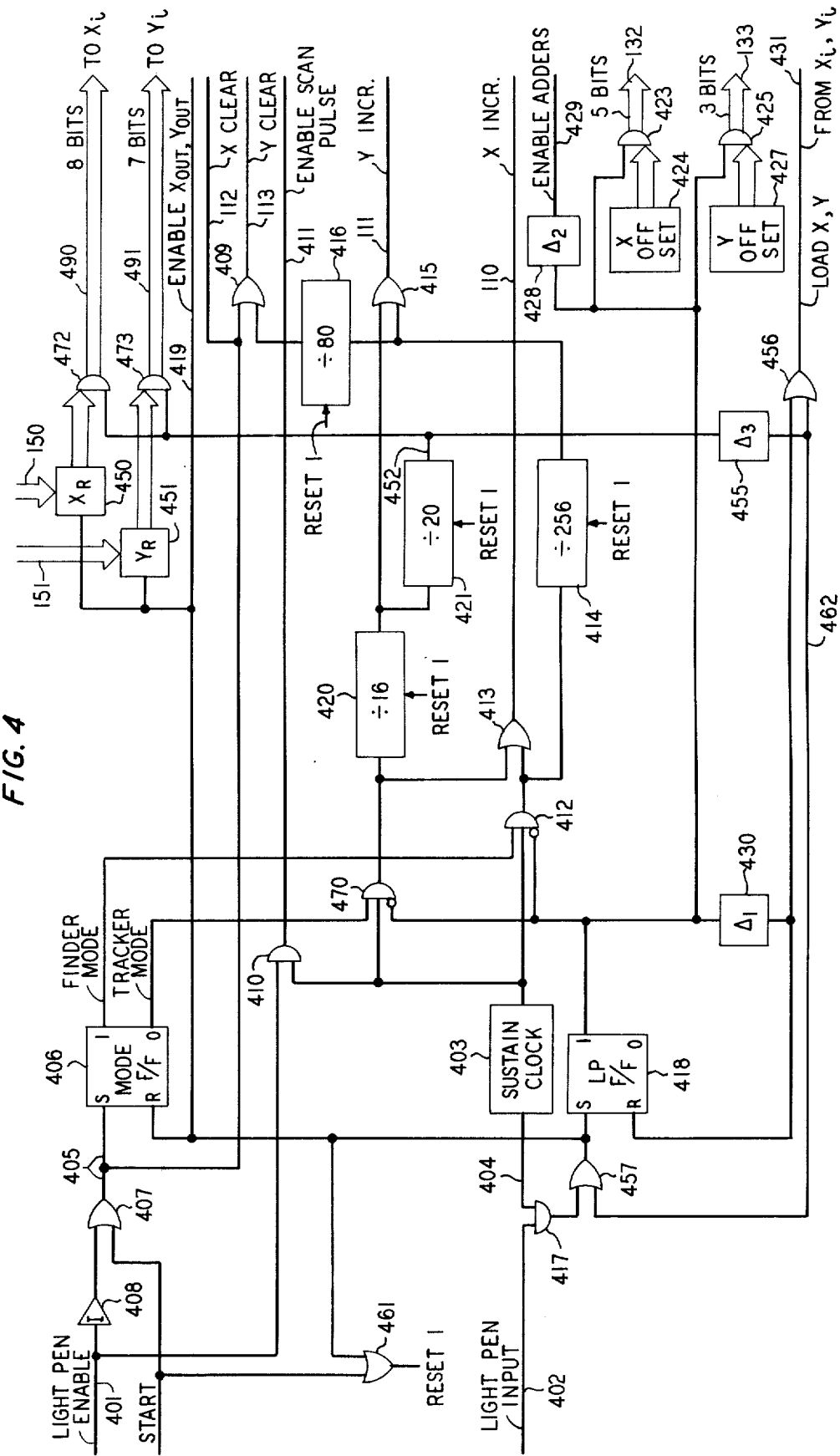
FIG. 4 illustrates a control circuit useful in connection with the circuit of FIG. 2.

The timing and control circuit 140 in FIG. 2 may be realized in a number of ways. For example, the operations and signal generation required may be performed by a programmed digital computer which may also be composing the information to be displayed on the panel 101. Alternatively, fixed read-only memory may be used to supply the required control signals based on clock signals and external inputs, e.g., from light pen 141. Thus circuit 140 may be a microprogrammed special purpose processor. FIG. 4 shows still another alternative embodiment for the timing and control circuit 140.

The inputs at the left of FIG. 4 include signals on lead 401 indicating that the light pen 141 is enabled, e.g., held with its light-sensing tip against the plasma panel 101. The input lead 402 is useful for signalling that a light pen strike has occurred, i.e., a light pulse has been detected by light pen 141. To distinguish the light pulses occurring at the special time described in the Ngo application, a light pen gating clock derived from the sustain clock signal source 403 conveniently supplies a signal on lead 404 which gates (in AND gate 417) the light pen inputs on lead 402. Thus only those special light pulses corresponding to the scanning pulse are passed to OR gate 457. The start lead 405 is supplied with a signal by the system user when light pen strike detection and/or tracking are to be accomplished.

Flip-flop 406 is designated the mode flip-flop and is in the set condition when the system is in the finder mode and is in the reset condition when the system is in the tracker mode. Because system operation advantageously starts in the finder mode, the start signal on lead 405 is arranged to set flip-flop 406 by way of OR gate 407. When it is desired that switching from the tracker mode to the finder mode be accomplished whenever the light pen 141 is removed from the plasma panel 101, another input to OR gate 407 has applied to it an inverted version of the light pen enable signal. The inversion is conveniently performed in inverter 408.

The "establish finder mode" signal on lead 405 is also advantageously applied on lead 112 to clear the X register 105 and, by way of OR gate 409, to lead 113 to clear the Y register 106. When the light pen enable signal on lead 401 is in the 1 state, this indicates that the special scanning erase pulse may be enabled. It proves convenient to use this signal on lead 401 in AND gate 410 to provide enable pulses on lead 411. This latter lead is then used by the circuitry of the Ngo application to generate the specially timed erase pulse.

While flip-flop 406 is in the 1 state (corresponding to the finder mode), clock signals from sustain clock 403 are applied by way of AND gate 412 and OR gate 413 to X increment lead 110. This causes the scan pulse to be applied to successive cells along a given row of the plasma panel 101. The signals on the output of gate 412 are also applied to counter 414, which generates an output pulse when a scan has been completed along a given scan line, i.e., after 256 pulses from sustain clock 403. This output pulse from counter 414 is then applied to Y increment lead 111 by way of OR gate 415. In this manner the special erase pulse is scanned cell-by-cell, line-by-line over the face of the plasma panel. If no light pen strike is detected after all 80 rows have been scanned, counter 416, which counts Y increment signals, provides a Y clear signal by way of OR gate 409 to lead 113. The scanning of the erase pulse thus repeats until a light pen strike occurs or until the light pen is disabled.

When a valid light pen strike, i.e., one associated with the scanning pulse, occurs, it passes by way of AND gate 417 and OR gate 457 to set the LP flip-flop 418. The setting of flip-flop 418 causes clock signals from sustain clock 403 to be inhibited at AND gate 412 rather than pass to the X and Y increment leads 110 and 111. Thus the contents of X and Y registers 105 and 106 are temporarily frozen to the values corresponding to the location of the light pen strike. The valid light pen strike signal also causes the contents of the X and Y registers to be delivered to the utilization device by gating the $X_{out}$ and $Y_{out}$ sets of leads 150 and 151. This latter gating signal is conveniently delivered on lead 419.

The valid light pen strike signal also causes the mode flip-flop to be reset, thus indicating the entering of the tracker mode. Concurrently, the RESET 1 signal is generated in OR gate 461 and used to reset counters 414, 416, as well as additional counters 420 and 421 which have maximum counts of 16 and 20 respectively.

LP flip-flop 418 also enables, by way of AND gate 423, the application of offset signals from X offset circuit 424 to the input 132 to adder 122. Similarly, by way of AND gate 425, offset signals from Y offset circuit 427 are applied to leads 133, one input to Y adder 123. The X and Y offset circuits typically assume the form of fixed voltages, e.g., permanently on (or off) transistors or the like.

The LP flip-flop also provides a signal, after a delay introduced by delay unit 428, to control lead 429 which enables the loading of the X and Y offset signals and partial X and Y register words thereby to enable adders 122 and 123. The delay provided by delay unit 428 is indicated to be $\Delta_2$, which is less than the delay, $\Delta_1$, provided by delay unit 430. This delay unit 430, also responsive to the setting of flip-flop 418, applies an enable signal on lead 431 thence to X SET and Y SET leads 114 and 115, which permits the transfer of the contents of $X_i$ and $Y_i$ registers 120 and 121 to X and Y registers 105 and 106, respectively. The $X_i$ and $Y_i$ registers will by this time have stored in them the required starting point coordinates for the tracker mode scan. It will be recognized that the "enable adders" signal on lead 429 may be used instead to merely gate the output of adders 122 and 123 and the low order bits from registers 105 and 106. That is, lead 429 may supply the $X_i$ SET and $Y_i$ SET functions.

Upon transfer of these coordinates to registers 105 and 106 in response to the signal on lead 431, tracker mode scanning may begin. Thus LP flip-flop 418 is reset in response to the load signal on lead 462. This permits clock signals from sustain clock 403 to again be applied to enable scan lead 411 and, in addition, to X increment lead 110 by way of AND gate 470 and OR gate 413. Clock signals are inhibited by the inhibiting at AND gate 412 from passing to counters 414 and 416 while the system is in the tracking mode.

The clock pulses supplied to lead 110 are counted by counter 420; when a count of 16 is reached, counter 420 is recycled and an output is generated on Y increment lead 111 by way of OR gate 415. This causes the tracking mode scan to proceed from cell to cell along a second row after completing the scan along the preceding row.

This process of line-by-line scanning continues until a light pen strike is again detected or until the scanning of the tracking mode window or patch is complete. When a valid light pen strike occurs, the sequence of operations resulting in a transfer from the finder mode to the tracker mode is repeated; again the updated position of the light pen is transferred to the utilization device.

The movement of a light pen within the tracking mode scanning window, but to a location which does not include any cells in the "on" state within the field of view of the pen, is likewise easily treated. It will be appreciated that the lack of at least one on cell within the field of view of the light pen will cause the tracking mode scan to be completed without a light pen strike being detected. Subsequent motion of the light pen to a position including one or more on cells within the field of view of the light pen is, of course, a distinct possibility. Thus the preferred means of detection is to cause a rescan of the previous patch to occur. For this purpose, X rescan register 450 and Y rescan register 451 advantageously store the coordinates identified upon the previous light pen strike, i.e., concurrently with the delivery of these coordinates to the utilization device on sets of leads 150 and 151. Then, when counter 421 recycles from its maximum count to its all-zero count, i.e., when an end-of-patch output appears on lead 452, the contents of registers 450 and 451 are transferred by way of AND gates 472 and 473 to $X_i$ and $Y_i$ register 120 and 121, respectively. After a short delay, $\Delta_3$, provided by delay unit 455, the end-of-patch signal passes by way of OR gate 456 to lead 431, thereby to enable the contents of the $X_i$ and $Y_i$ registers to transfer to the associated X, Y registers. Simultaneously, the output of delay unit 455 also passes by way of OR gate 457 to set the LP flip-flop 418.

Thus the end-of-patch pulse acts like a light pen input pulse to cause the contents of the X and Y registers 105 and 106 to act as the reference data for establising the scan beginning point. Because of the prior transfer to the X and Y register of the coordinates representing the previous light pen strike, the scan window is identical to the previous one. This rescan process is repeated for as long as no light pen strike occurs and as long as the light pen is enabled. It is sometimes preferred that a time-out feature cause a return to the finder mode. Thus a counter is arranged to count the end-of-patch signals appearing on lead 452; when a predetermined count is reached, a return to the finder mode causes flip-flop 406 to be set, e.g., by an additional input on OR gates 407 and 461.

In the rare event that the light pen has been moved from within the window or patch of the tracking mode scan, so that no light pen strike is detected during a complete tracking mode scan, one of several options may be pursued. For example, the tracking mode scan may be repeated one or more times, as in the case of the off-cell position of the light pen, in the hope that the light pen will return to the area of the scanned patch. Alternatively, a return to the finder mode may be accomplished and the above-described control sequence repeated. This return may be accomplished simply by removing the light pen from the face of the plasma panel.

While the rescan-upon-no-light-pulse sequence described above is effective for most purposes; it is sometimes desirable to simplify this operation and the associated apparatus. Thus rather than employ separate light-pen strike location registers 450 and 451 and their associated gating circuitry to form starting point coordinates, it is sometimes preferable to merely store the calculated starting point coordinates in $X_i$ and $Y_i$ registers 120 and 121. That is, the beginning point formed in registers $X_i$ and $Y_i$ upon a light pen strike may be sorted there until a new starting point is needed. If a light pen strike dictates new coordinates, the adders are called on as usual.

Upon receiving an affirmative answer to the test at step 314 in FIG. 3 (i.e., when an end-of-scan output is generated on lead 452 in FIG. 4 before a light pen strike occurs), all that is required is to provide a transfer of the contents of $X_i$ and $Y_i$ registers to the respective X and Y registers. This is readily accomplished by the signals on lead 431 in FIG. 4 (i.e., the X SET and Y SET signals on leads 114 and 115 in FIG. 2).

While typical panel and tracker mode scan patch sizes have been presented above, no such limitations are inherent in the present invention. Similarly, while plasma panel display devices were emphasized, any addressable, plural-display-site device may incorporate the present invention, provided only that each of the sites, or some collection of them, may be caused to emit an output signal at a unique time in its cycle which is different than that for normal display output. Further, while only on cells have been specifically mentioned as indicating light pen strikes, the general scanning techniques are applicable to other systems in which both on and off cells (cells of any particular brightness) may be detected. Thus, for example, the scanning and light pen detection techniques described in U.S. Pat. No. 3,651,509 issued Mar. 21, 1972 to Ngo may be used in place of the above-identified Ngo application. U.S. Pat. No. 3,651,509 is hereby incorporated by reference in the present disclosure.

Still further, while visible light output has been assumed in connection with the light pen detection, other particular output signals and detectors may prove useful in particular cases.

In addition, though two-dimensional scanning has been described above, the techniques are equally applicable to one- and three-dimensional display spaces. Thus a moving scanning window based on a previously sensed location may be generated in accordance with the above-described techniques for motion along a line or in a volume.

Further, while the reference area for a particular tracking mode scan has been advantageously chosen to be a scan patch centered at the location of a previous light pen strike, other particular relationships to a preceding light pen strike location may prove useful. Thus, when a light pen strike occurs near the edge of a display surface, it may prove useful to have the succeeding scan patch off-center with respect to the light pen strike location. This is particularly advantageous when part of the succeeding scan would otherwise tend to "wrap-around," thereby appearing at the extreme opposite side of the display surface. All that is required to effect this off-center patch positioning is a circuit responsive to the absolute coordinates of a light pen strike and a selectable plurality of offset circuits like circuits 424 and 427, each for generating an appropriate offset to keep the tracking window from "wrapping around."

Still further, while a fixed window or patch size has been illustrated in the above detailed description, it may be desirable to vary the size of such a patch based on the success in tracking at another size. As was noted above, extremely fast light pen motion can be tracked with very small patch sizes. The speed of particular circuitry, such as the adders 122 and 123, and the sustain cycle period will determine an optimum tracking mode scan patch size when extremely high speed tracking is required.

While two-mode tracking has been described above, the same principles are applicable to a higher number of modes, e.g., three modes. Also, the bulk scanning, i.e., by segments or one of the various decimation schemes, may be used to advantage in the finder or tracker modes. For such decimation purposes the X increment and Y increment signals may be applied to other than the lowest order stage of the X and Y counter-registers 105 and 106. Appropriate sector addressing techniques are described, for example, in U.S. Pat. No. 3,798,632 issued Mar. 19, 1974 to D. E. Liddle, which patent is hereby incorporated by reference.

Though pressure sensitive switch means on a light pen has been identified as particularly desirable for causing a reversion to the finder mode, it should be clear that other mechanical or electrical proximity detection means will be appropriate in other cases. For example, a depressible pressure sensitive panel overlay or devices based on capacitive coupling may be appropriate.

What is claimed is:

1. Apparatus for detecting a moving light sensor over a plasma panel display surface having a plurality of plasma cells located at respective display sites, selected ones of said plurality of cells being periodically activated, thereby to emit light pulses at periodic intervals and at a fixed time in each such interval, comprising
   first means for sequentially activating at least selected ones of said plurality of plasma cells at times different from said fixed times,
   second means for sequentially activating at least selected ones of a subset of said plurality of plasma cells at times other than said fixed times, the position of said subset having a predetermined relationship to the position of said light sensor at the time said sensor last detected a light pulse at one of said plurality of plasma cells at other than said fixed time,
   first control means responsive to the light pulse generated by said first means for causng following sequential activating to be accomplished by said second means,
   output means responsive to said light sensor for generating signals indicating the positions at which said sensor detects light pulses at other than said fixed times, and
   second control means responsive to the removal of said sensor from said display surface for causing the immediately following sequential activating of plasma cells to be accomplished by said first means.

2. Apparatus according to claim 1 wherein said second control means comprises a switch responsive to a lack of contact between said sensor and said display surface for temporarily deactivating said second means and for activating said first means.

3. Apparatus according to claim 2 wherein said plasma panel comprises a rectangular area with plasma discharge cells disposed substantially uniformly in a rectangular array having M rows and N columns, and wherein said first means comprises means for sequentially activating beginning at a reference point located at a corner of said rectangular array.

4. Apparatus according to claim 3 wherein said first means comprises means for activating every jth cell along each row, beginning at said reference point, the ith of said rows being selected after selection along the (i-1)th row has been completed, and means for terminating said selecting upon detection of a light pulse at other than said fixed time.

5. Apparatus according to claim 4 wherein $j = 1$.

6. Apparatus according to claim 4 wherein $j$ is an integral power of 2.

7. Apparatus according to claim 4 wherein said first means comprises means for simultaneously activating sets of K selected plasma cells, K being an integer greater than 1, third means for sequentially selecting ordered sets of K plasma cells, the first of said sets of K plasma cells including a cell located at said reference point, and means for terminating said selection of said sets of K cells when a light pulse is detected which was generated by said first means.

8. Apparatus according to claim 4 further comprising means for causing said first means to successively repeat its sequential activation of said plasma cells in said array when not terminated by said means for terminating during said sequential activation of said array.

9. The machine method of tracking a light sensor moving over a plasma panel display surface having a plurality of plasma cells comprising the steps of
   A. generating a visible image on said display surface, with individual cells activated by said generating emitting light signals at fixed period times,
   B. generating a finder mode scanning light pulse beginning at a reference point on said display surface and continuing over said surface until detected by said light sensor located at an arbitrary first position on said display surface, said finder mode scanning light pulse being generated by sequentially activating at least some of said cells on said panel at other than said fixed times,
   C. generating a tracker mode scanning light pulse over an area comprising a subset of said display surface and having a known position relative to said first position, said tracker mode scanning light pulse continuing until detected by said light sensor at a second position, said tracker mode scanning light pulse being generated by sequentially activating at least some of said cells in said subset at other than said fixed times, and
   D. repeating step C with said second position replacing said first position until said light sensor is removed from immediate proximity with said display surface.

10. The method of claim 9 further comprising the step of returning to step D when said light sensor is removed from immediate proximity with said display surface.

* * * * *